2,887,474

ADDITION COMPOUNDS OF PIPERAZINEDIONES

Arthur Alter, Waukegan, Harold E. Zaugg, Lake Forest, and Richard U. Schock, Waukegan, Ill., assignors to Abbott Laboratories, North Chicago, Ill., a corporation of Illinois No Drawing. Application February 11, 1957
Serial No. 639,220

11 Claims. (Cl. 260—96.5)

This invention relates to novel substituted 2,5-piperazinediones-sarcosine anhydride-sustituted urea complexes and to the process for preparing these compounds.

The substituted piperazinediones-substituted urea complexes of the present invention are distinct chemical compounds having definite chemical and physical properties differing from the individual components of the complex and are comprised in general of two moles of the substituted urea composition for each mole of sarcosine anhydride compound.

The compounds of the present invention are represented by the following general formula:

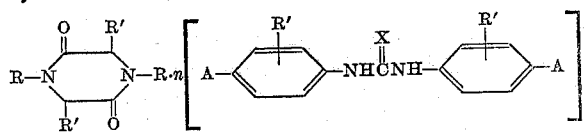

wherein R is a methyl group or a substituted methyl group, R' is hydrogen, halogen or a lower alkyl group, A is a nitro, cyano, trimethyl ammonium, sulfamyl, sulfonic acid or other electron withdrawing group, X is NH, O, or S, and $n$ is the integer 1 or 2.

The compounds of the present invention are prepared by reacting a substituted 2,5-piperazinedione compound having the general formula:

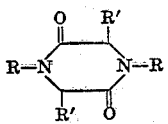

wherein R is a methyl group or a substituted methyl group, and R' is hydrogen or a lower alkyl group, with a substituted urea compound having the general formula:

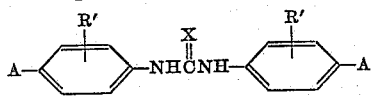

wherein R' is a lower alkyl group, A is anitro, cyano, carboxyl, carboalkoxy, acetyl, or other electron withdrawing group, and X is NH, O, or S.

The foregoing reaction can be conveniently effected by mixing at room temperature, the desired sarcosine anhydride compound and the substituted urea compound in the presence of an inert organic solvent with stirring until the complex is formed, followed by filtering to recover the solid complex from the remaining liquids of the reaction mixture. Any inert organic solvent can be employed in the present invention and among those most useful are the lower aliphatic alcohols, the usual hydrocarbon and ether solvents and, if desired, mixtures thereof.

The following specific examples are set forth for the purpose of illustrating the present invention and should not be construed to limit the invention to the precise components or proportions employed.

EXAMPLE I

Sarcosine anhydride-(4,4'-dinitrodiphenylguanidine) complex

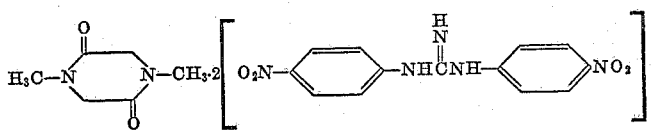

A mixture of 3.0 grams (0.01 mole) of 4,4'-dinitrodiphenylguanidine, 2.1 g. (0.015 mole) of sarcosine anhydride and 20 ml. of methanol is stirred at room temperature for 6 hours. The solid product, 4,4'-dinitrodiphenylguanidine-sarcosine anhydride complex, is filtered, suspended in 20 ml. of methanol and again stirred. The product is then filtered and washed with methanol. The yield is 3.0 g.; M.P. 204–205°.

The product, sarcosine anhydride-(4,4'-dinitrodiphenylguanidine) complex, on chemical analysis is found to contain 51.65% C, 4.49% H, 22.25% N and 21.30% O; as compared with a theoretical analysis of 51.7% C, 4.3% H, 22.6% N and 21.4% O.

EXAMPLE II

Sarcosine anhydride-(4,4'-dinitrocarbanilide) complex

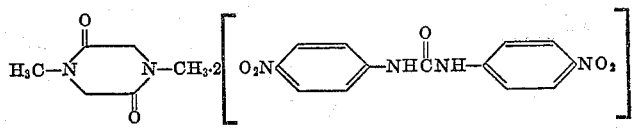

A mixture of 18.0 g. (0.06 mole) of 4,4'-dinitrocarbanilide, 5.7 g. (0.04 mole) of sarcosine anhydride and 120 ml. of methanol are stirred for 16 hours. The product is separated by filtration and washed liberally with methanol. The product, sarcosine anhydride-di(4,4'-dinitrocarbanilide), after drying weighs 20.5 grams and melts at 285–6° C. with decomposition.

The said product on chemical analysis is found to contain 51.6% C, 4.00% H, 19.00% N, 25.65% O; as compared to the theoretical analysis of 51.47% C, 4.05% H, 18.76% N, 25.71% O.

EXAMPLE III

Sarcosine anyhdride-(4,4'-dinitrodiphenylthiourea) complex

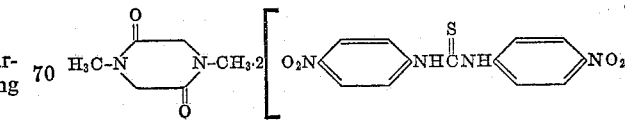

A mixture of 3.2 g. (0.01 mole) of 4,4'-dinitrodiphenylthiourea, 2.1 g. (0.015 mole) of sarcosine anhydride and 20 ml. of methanol are stirred for 6 hours. The product, sarcosine anhydride-di(4,4'-dinitrodiphenylthiourea), is filtered and washed with methanol. The product is obtained in a yield of 3.4 g. and has a M.P. of 210–211°.

The said product on chemical analysis is found to contain 49.5% C, 4.1% H, 17.76% N, 20.97% O, 9.01% S; as compared to the theoretical analysis 49.35% C, 3.88% H, 17.99% N, 20.54% O, 8.23% S.

EXAMPLE IV

Sarcosine anhydride-(4,4'-dicyanocarbanilide) complex

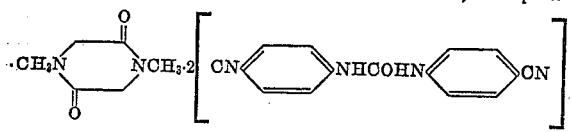

A mixture of 4,4'-dicyanocarbanilide (2.6 g.) and sarcosine anhydride (2.8 g.) is stirred at room temperature with 25 ml. methyl alcohol for 8 hours. The complex solid product formed is filtered, washed with a few cc. of methyl alcohol, and dried in a vacuum oven. A yield of 3.78 g. of the said complex is obtained having a M.P. of 262–3° C. On chemical analysis, the said complex is found to contain 64.60% C, 4.58% H, and 21.22% N; as compared with a theoretical analysis of 64.85% C, 4.54% H, and 21.01% N.

EXAMPLE V

Sarcosine anhydride-(4,4'-disulfamylcarbanilide) complex

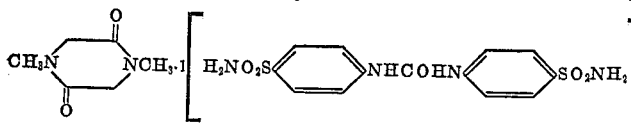

A mixture of 4,4'-disulfamylcarbanilide (3.7 g.) is stirred in 25 ml. methyl alcohol with 2.8 g. (0.02 M) sarcosine anhydride at room temperature for 8 hours. The solid complex product is filtered, washed with few cc. methyl alcohol, and dried in a vacuum oven. A yield of 4.8 g. of the said complex is obtained having a M.P. of 253–4° C. On chemical analysis, the said complex is found to contain 44.79% C, 4.95% H, and 12.31% S; as compared with the theoretical analysis of 44.52% C, 4.72% H, and 12.51% S.

EXAMPLE VI

Sarcosine anhydride-(4,4'-dinitro-2,2'-dichlorocarbanilide complex

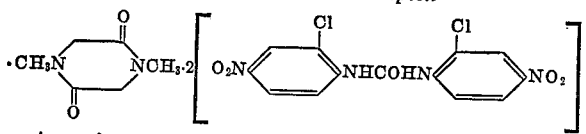

A mixture of 4,4'-dinitro-2,2'-dichlorocarbanilide (3.7 g.) and sarcosine anhydride (2.8 g.) is stirred at room temperature with 25 ml. methyl alcohol for 8 hours. The complex product is filtered, washed with a few cc. of methyl alcohol, pressed dry, and dried in a vacuum oven. A yield of 4.0 g. of the said complex is obtained having a M.P. of 280–1° C. On chemical analysis, the said complex is found to contain 43.39% C, 3.18% H, and 15.77% N; as compared with a theoretical analysis of 43.46% C, 2.96% H, and 15.84% N.

The sarcosine anhydride-substituted urea complexes of the present invention have shown marked activity against *E. tenella* and are useful for controlling the disease designated "coccidiosis" of which *E. tenella* is one of the chief causative agents and which is commonly found in chickens and other poultry. Accordingly, one practical embodiment of the present invention is an ingestible poultry composition containing a small amount of a sarcosine anhydride-substituted urea complex of the present invention as the active ingredient thereof. The said complex being relatively stable, high melting solid can be conveniently dispersed in an inert non-toxic carrier, either liquid dispersion or solid, and which can be safely administered to poultry. Any of the usual poultry feed compositions can be used as a carrier for the new complexes of the present invention, including mixtures containing ground corn meal, soybean meal, bone meal, limestone flour or water.

A typical poultry feed containing a complex of the present invention has the following composition:

| | |
|---|---|
| Yellow corn meal _____ pounds__ | 1200.00 |
| Soybean oil meal _____ do____ | 700.00 |
| Steamed bone meal _____ do____ | 50.00 |
| Limestone flour _____ do____ | 30.00 |
| Iodized salt _____ do____ | 20.00 |
| Manganese sulfate _____ do____ | 00.06 |
| Riboflavin _____ mg__ | 3000 |
| Vitamin B$_{12}$, crystalline _____ mg__ | 1500 |
| Sarcosine anhydride-di(4,4'-dinitrocarbanilide) pounds__ | 0.25 |

It will be apparent that the complex of the present invention comprises about 0.0125% of the feed mixture.

For convenience of handling and for mixing the said complex into the poultry feed, it is desirable to prepare a "pre-mix" which contains between 5% and 50% by weight of the said complex, dispersed in a corn meal feed base or combination of other meals used to prepare the feed.

The complexes of the present invention are effective in the control of coccidiosis in poultry at very low concentrations and marked activity is evident when as little as 0.005% by wt. thereof, is incorporated in a poultry feed mixture. It is preferred, however, to use the complexes of the present invention at a level of almost 0.0125% by wt. in the complete poultry feed mix. Higher concentration up to about 0.1% by wt. can also be effectively used.

The following anticoccidial test data shows the effectiveness of the compositions of the present invention:

TABLE I

| Test Compound | Percent Compound in Diet | Percent Mortality from Coccidiosis | | Severity of Lesions in Survivors |
|---|---|---|---|---|
| | | Treated | Untreated | |
| Sarcosine anhydride-di (4, 4' - dinitrocarbanilide) | 0.01 | 6 | 49 | 2.6 |
| | 0.02 | 0 | 49 | 1.9 |
| | 0.05 | 0 | 49 | 0.9 |
| | 0.10 | 0 | 49 | 0.5 |
| | 0.00 | 0 | 49 | >2.7 |

The procedure used to obtain the above data under conditions of severe challenge was to mix the specified test compound on the specified amounts in a standard chick starter diet, and start 7-day old chicks on the medicated feed. Twenty-four hours later the chicks were infected by gavage with 500,000 oocysts of *E. tenella*. This was designed to give a death rate of around 50% in untreated controls. The chicks were continued on the medicated feed continuously until 7 days' post-treatment. Birds dying during the 7-day period were necropsied for evidence of coccidiosis. The survivors at the end of 7 days were all sacrificed and similarly examined, The results with 5 different dosages of the test compound are shown in Table I in terms of mortality rate in the 7-day period, the percent of the survivors showing lesions (at 7 days), and the average severity of the lesions. The average severity of the lesions is determined by examining each survivor for lesions which are rated as being absent, very light, light, medium, or heavy, and which are then given a numerical value of 0, 1, 2, 3, and 4, respectively. The sum of the numerical values of all survivors by the number of survivors gives the "severity of lesions" of Table I.

Others may readily adapt the invention for use under various conditions of service, by employing one or more of the novel features disclosed or equivalents thereof. As at present advised with respect to the apparent scope of our invention, we desire to claim the following subject matter.

We claim:

1. A compound having the general formula

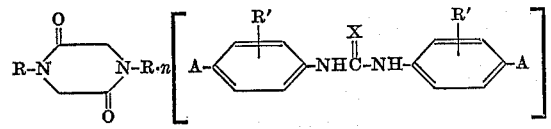

wherein R is a methyl group, R' is selected from the group consisting of hydrogen, chlorine, and lower alkyl, X is selected from the group consisting of oxygen, sulfur and NH, A is an electron withdrawing group selected from the group consisting of a nitro, cyano, dimethylammonium, sulfamyl, and sulfonic acid groups, and $n$ is an integer greater than 0 and less than 3.

2. A compound having the general formula

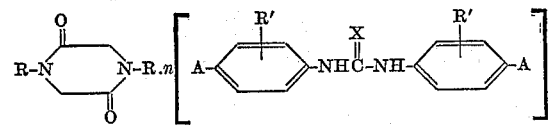

wherein R is a methyl group, R' is hydrogen, X is NH, A is a nitro group, and $n$ is 2.

3. A compound having the general formula

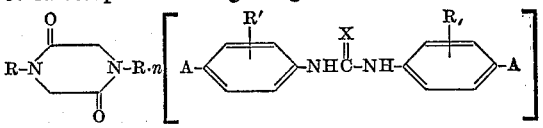

wherein R is a methyl group, R' is hydrogen, X is oxygen, A is a nitro group, and $n$ is 2.

4. A compound having the general formula

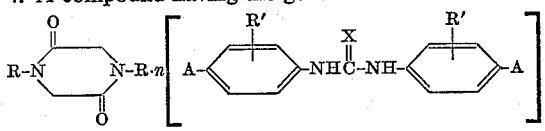

wherein R is a methyl group, R' is hydrogen, X is sulfur, A is a nitro group, and $n$ is 2.

5. The sarcosine anhydride 4,4'-dinitrodiphenylguanidine complex.

6. The sarcosine anhydride 4,4'-dinitrocarbanilide complex.

7. The sarcosine anhydride 4,4'-dinitrodiphenylthiourea complex.

8. The sarcosine anhydride 4,4'-dicyanocarbanilide complex.

9. The sarcosine anhydride 4,4'-disulfamylcarbanilide complex.

10. The sarcosine anhydride 4,4'-dinitro-2,2'-dichlorocarbanilide complex.

11. A compound having the general formula

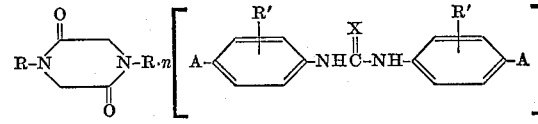

wherein R is a methyl group, R' is chlorine, X is oxygen, A is a nitro group, and $n$ is 2.

References Cited in the file of this patent

Cuckler et al.: Science, 122, pp. 244–5 (1955).